United States Patent
Brewer et al.

(10) Patent No.: US 9,914,359 B2
(45) Date of Patent: Mar. 13, 2018

(54) VEHICLE CONTROL SYSTEM

(71) Applicant: International Business Machines Corporation, Armonk, NY (US)

(72) Inventors: Derek R. Brewer, Bowling Green, OH (US); Kerry M. Langford, Rochester, MN (US); Robert D. Wilhelm, Cheyenne, WY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/833,188

(22) Filed: Aug. 24, 2015

(65) Prior Publication Data

US 2016/0362112 A1 Dec. 15, 2016

Related U.S. Application Data

(63) Continuation of application No. 14/735,313, filed on Jun. 10, 2015.

(51) Int. Cl.
*B60W 40/08* (2012.01)
*B60K 28/06* (2006.01)
(Continued)

(52) U.S. Cl.
CPC .............. *B60K 28/06* (2013.01); *B60W 40/08* (2013.01); *G06F 17/20* (2013.01);
(Continued)

(58) Field of Classification Search
CPC .......... A61B 5/18; G08B 21/06; B60K 28/06; B60W 40/08; B60W 40/0818;
(Continued)

(56) References Cited

U.S. PATENT DOCUMENTS 6,236,968 B1 * 5/2001 Kanevsky .............. G08B 21/06
704/270
6,909,947 B2 6/2005 Douros et al.
(Continued)

FOREIGN PATENT DOCUMENTS

| CN | 203275658 U | 11/2013 |
|---|---|---|
| WO | 2008008655 A2 | 1/2008 |
| WO | 2014120053 A1 | 8/2014 |

OTHER PUBLICATIONS

Mell et al., "The NIST Definition of Cloud Computing", Recommendations of the National Institute of Standards and Technology U.S. Department of Commerce. Special Publication 800-145, Sep. 2011. 7 pages.

(Continued)

*Primary Examiner* — Hongmin Fan
(74) *Attorney, Agent, or Firm* — Daniel C. Housley

(57) ABSTRACT

A vehicle can be controlled based on feedback from a driver of the vehicle when a mobile device is connected to a computer system. A profile for a driver can be used. The system can receive data about the driver from the mobile device. The data and answers can be sent to a natural language processing (NLP) system for analysis. The NLP system can return a determination that the user is cognitively disengaged, and thus unable to safely drive the vehicle. The system can then control the vehicle.

9 Claims, 7 Drawing Sheets

(51) Int. Cl.
*G06F 17/20* (2006.01)
*G06F 17/27* (2006.01)
*B60W 50/00* (2006.01)

(52) U.S. Cl.
CPC . *G06F 17/2765* (2013.01); *B60W 2040/0818* (2013.01); *B60W 2040/0872* (2013.01); *B60W 2050/0095* (2013.01)

(58) Field of Classification Search
CPC ......... B60W 40/0827; B60W 40/0836; B60W 40/0845; B60W 40/0863; B60W 40/0872; B60W 40/09
See application file for complete search history.

(56) References Cited

U.S. PATENT DOCUMENTS

| | | |
|---|---|---|
| 7,349,782 B2 | 3/2008 | Churchill et al. |
| 7,642,922 B2 | 1/2010 | Itou |
| 8,022,831 B1 | 9/2011 | Wood-Eyre |
| 8,874,301 B1 | 10/2014 | Rao et al. |
| 9,124,955 B2 | 9/2015 | Geva et al. |
| 9,164,956 B2 | 10/2015 | Kim et al. |
| 9,308,914 B1 | 4/2016 | Sun et al. |
| 2008/0252466 A1* | 10/2008 | Yopp ............... B60K 28/066 340/576 |
| 2011/0304465 A1 | 12/2011 | Boult et al. |
| 2012/0112879 A1* | 5/2012 | Ekchian ............. A61B 5/117 340/5.53 |
| 2013/0274986 A1 | 10/2013 | Trepagnier et al. |
| 2014/0203926 A1 | 7/2014 | Miller et al. |
| 2014/0240132 A1* | 8/2014 | Bychkov ............. A61B 5/18 340/576 |
| 2016/0052391 A1* | 2/2016 | Walsh ............... G08B 21/06 340/575 |
| 2016/0311440 A1* | 10/2016 | Gan ................. B60K 28/06 |

OTHER PUBLICATIONS

Brewer et al., "Vehicle Control System", U.S. Appl. No. 14/735,313, filed Jun. 10, 2015.
List of IBM Patents or Patent Applications Treated as Related, dated Aug. 18, 2015, pp. 1-2.

* cited by examiner

VEHICLE CONTROL SYSTEM

BACKGROUND

The present disclosure relates to vehicle control, and more specifically, to vehicle safety using smart device capabilities.

Drivers of vehicles on highways can pose a safety threat to themselves and others when they are distracted or otherwise unable to operate the vehicle correctly. Drivers who live with medical conditions may suffer from episodes which impact their cognitive state, thus impacting their ability to safely drive a vehicle. Driving skills and patterns can be monitored in order to determine whether or not a driver is safe to operate a vehicle. Alerts can be provided regarding the danger of particular driving situations, in order to improve the safety of the driver operating the vehicle.

SUMMARY

Embodiments of the present disclosure may be directed toward a computer implemented method for controlling a vehicle based on feedback from a driver of the vehicle. The system can connect to a user device. The user device may be associated with the driver of the vehicle, and the user device may be connected to the vehicle. A profile associated with the driver of the vehicle can be accessed based on the connecting. Data about the driver of the vehicle can be received. This data can be sent to a natural language processing (NLP) system. The NLP system can return a determination that the driver of the vehicle is cognitively disengaged. Based on this determination, the vehicle can be controlled.

Embodiments of the present disclosure may be directed toward a computer system for controlling a vehicle based on feedback from a driver of the vehicle. The system can have at least one processor circuit configured to connect to the user device. The user device may be associated with the driver of the vehicle and it can also be connected to the vehicle. The system can access a profile associated with the driver of the vehicle. The system can also receive data about the driver of the vehicle from the user device. The system can then send the data to a natural language processing (NLP) system. The system can receive from the NLP system a determination that the driver is cognitively disengaged and control the vehicle based on this determination.

Embodiments of the present disclosure may be directed toward a computer program product for controlling a vehicle based on feedback from a driver of the vehicle. The computer program product may comprise a computer readable storage medium having program instructions embodied therewith, where the computer readable storage medium is not a transitory signal per se. The program instructions may be executable by a computer processing circuit to cause the circuit to perform a method. The method may comprise connecting a computer system to the user device. The user device may be associated with the driver of the vehicle. The device may also be connected to the vehicle. The system may access a profile associated with the driver. Data about the driver of the vehicle can be received from the user device. The system can send to a natural language processing (NLP) system data about the driver. The NLP system can analyze the data and return a determination that the driver is cognitively disengaged. In response to this determination, the system can control the vehicle.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
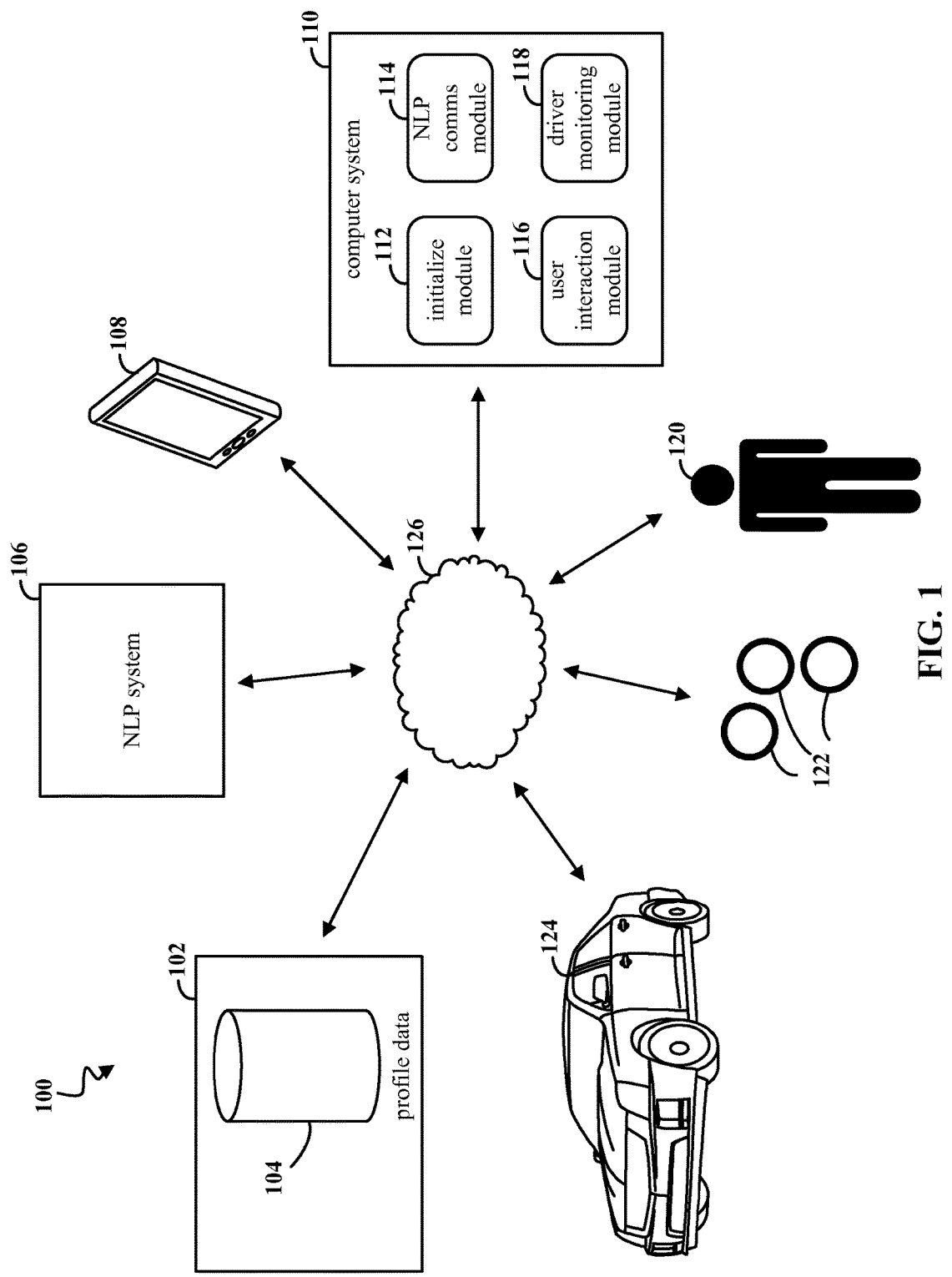
FIG. 1 depicts a block diagram of a system for controlling a vehicle based on a feedback from a driver of the vehicle, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to vehicle control, more particular aspects relate to monitoring a driver to determine if vehicle control is appropriate. While the present disclosure is not necessarily limited to such applications, various aspects of the disclosure may be appreciated through a discussion of various examples using this context.

Drivers with medical conditions like Alzheimer's, dementia, diabetes, or other conditions which may impact their ability to safely operate a vehicle or otherwise safely reach their destination may pose a hazard to themselves, other motorists, and pedestrians. In addition, sleep deprivation can lead a driver to be an unsafe or inattentive driver. A driver's own safety and well-being may be compromised by driving while their cognitive abilities are impaired.

Various embodiments are directed toward a computer system that can actively monitor a driver of a vehicle to provide intelligent and dynamic analysis of a driver's cognitive state in order to control a vehicle from being operated by a driver with an impaired cognitive state. As used herein, the word driver can mean anyone associated with control of a vehicle. The words driver and operator may be used interchangeably throughout the application, with both identifying a user as one who has some control over a vehicle.

The system can also notify family members, caregivers, medical personnel, or others, as is appropriate based on the driver's condition and state. As discussed herein, the analysis can be based on answers to questions, input destinations, feedback from sensors of the driver's facial expressions, feedback from one or more medical or fitness devices, a combination of the aforementioned, or other data. As also discussed herein, the control of the vehicle can include preventing a vehicle's engine from starting, following intelligent steps to take over driving, safely stopping, or other types of vehicle control.

As used herein, the vehicle can refer to a personal-use automobile such as a car, truck, or sports utility vehicle. A vehicle can also refer to a commercial vehicle such as a bus, semi truck, taxicab or travel trailer. Other examples include railed vehicle (e.g., trains), watercraft (e.g., ships and boats), aircraft (e.g., commercial jets), construction vehicle, and spacecraft. Data about an operator of any of these vehicle could be used in determining whether or not a computer system should control the vehicle.

According to embodiments, the computer system can be configured to connect to a user device. The user device can be associated with the driver of the vehicle. The user device may also be connected to the vehicle, based on, for example, a certain proximity to the vehicle. For example, a driver may have his cell phone in a backpack he is carrying. Once the driver and his backpack enter the vehicle, the cell phone and the vehicle could be connected, and the system can connect to the cell phone. The system could be configured to then access a profile associated with the driver of the vehicle. For example, if the user device is the cell phone from the previous example, the driver may have set up an account on the device and registered it as his personal cell phone. In this instance, there could be a single profile associated with the user device, and thus the system could access the profile for the driver based solely on the connecting of the system to the device. In another example, though, a shared device could be used, which could mean multiple driver profiles were associated with a particular device. In this case, the system could cause the device to ring or vibrate, in order to alert or remind the driver. The driver could then locate and look at the device. The device could prompt the driver to enter account information or the system could identify the driver based on sensors on the device or within the vehicle. Based on the identification, the device could then access the profile associated with the driver.

The system could then send prompts to the user device, based on the profile. These prompts could be questions designed to test the cognitive abilities of the driver. For example, the profile for the particular driver in the earlier example could indicate he has Type 2 diabetes, but overall he is in relatively good health. In this case, the system could send prompts targeting the cognitive abilities that could be affected by a low glucose (hypoglycemic) episode. For example, the device could prompt the user, either visually on the screen or audibly, through the device or vehicle speakers, to enter his birthday or the day of the week. The user could input the answers to this question, and the system could collect those inputs for analysis. A nonsensical answer or no answer could also be received as input from the user device, which could then be used by the system in analyzing the driver's capacity to drive.

The system could also receive data about the driver from the user device. This data could be collected through the use of sensors on the device or in the vehicle. For example, in an example where the driver is diabetic, sensors on the device could collect data as to whether or not the driver is looking at the device, or if the driver is showing visible signs of a hypoglycemic episode like shaking, seizing, or a general lack of coordination. If a driver is wearing a fitness tracking apparatus that is synced to the device, the system could also receive data from the device about the user's heart rate and fitness levels for the day. The system could also receive location, date, and time data from the user device.

The device can store this data locally or it can be transmitted over one or more networks to a server to be analyzed by a natural language processing (NLP) system. The NLP system can analyze the received data, the input from the user's device, and existing data in the driver's profile to determine whether or not the driver is cognitively engaged. If the NLP system determines the driver is not cognitively engaged, the computer system may take control of the vehicle. Continuing with the previous example, the computer system may receive an incorrect answer from the user via an audible response to a question asking the date. The computer system may also note that the driver is having more difficulty typing his destination coordinates into the dashboard navigation system than usual. The computer system may also have received data from the driver's fitness watch, via his cell phone, that his heart rate has been significantly elevated. This data can all be sent by the computer system to the NLP system.

In analyzing all of this data, in conjunction with historical data and personal data from the driver's profile, the NLP system may determine that the driver is not cognitively engaged. As used herein, 'not cognitively engaged' can refer to a user's inability to safely operate a vehicle. The phrase could also mean that the NLP system has determined the user's current cognitive state is altered from his or her usual state. The phrase could also mean that the NLP system has determined that, based on the data received from the computer system, the driver should not operate the vehicle in the intended way (e.g., should not drive to the specified location). As described herein, the system can have a feedback loop that can prompt the user for additional explanations or clarifications in the event that an inaccurate determination has been made. In the example given, the system could then prevent the driver from starting the vehicle.

According to some embodiments, the system can send notifications to specified parties, upon the determination that a driver is not cognitively engaged. This feature could be engaged based on a setting or other user-specified preference. For example, the diabetic driver in the example above may have his device set up to notify his spouse as well as an emergency medical service upon a confirmed determination that he, the driver, is not cognitively engaged. In another example, one of an elderly driver living in assisted living, the device could notify her caretakers or children. These settings could be selected before the incident, and could vary based on the profile of each user.

FIG. 1 depicts a block diagram of a system 100 for controlling a vehicle based on a feedback from a driver of the vehicle, according to embodiments. The system 100 of FIG. 1 can be configured to monitor a user 120, who may be driving a vehicle 124, determine a level of perceived cognitive engagement, and control the vehicle 124 in response to a determination. The system 100 depicted here may be carried out on various computer processing circuits, and may comprise a computer system 110. The computer system may comprise a number of modules including an initializing module 112, an NLP communication module 114, a user interaction module 116, a driver monitoring module 118, and additional modules or fewer modules. Each module may represent a processor executing a set of instructions. Each module could also represent a set of computer readable instructions executable by one or more processors.

A user 120 can include a driver of a vehicle. The user 120 may have in his possession a mobile device 108. This device could be a smartphone, tablet, or another device. The user 120 may have the device 108 in his possession by carrying the device, using the device, storing the device in a bag, setting the device in a close proximity, or in another way that could be considered possession. The user 120 may enter the vehicle 124 with the device 108 in his possession, and computer system 110 and the device 108 may connect via the initializing module 112 of the computer system 110 over one or more networks 126. The user device 108 may already be connected to the vehicle 124. The networks can include, but are not limited to, local area networks, point-to-point communications, wide area networks, the global Internet, and combinations thereof.

In response to the connecting, the initializing module 112 can access a data repository 102, to retrieve profile data 104 associated with the user 120. As described herein, the profile data 104 may be accessed based on profile-identifying data associated with the device 108 (e.g., a cell phone name). The profile access may also be based on profile-identifying data associated with an account or log in credentials used on the device 108. The profile access could also be based on data about the identity of the user 120 (e.g., driver) based on data collected from sensors 122 located within the vehicle 124, sensors 122 on the device 108, sensors 122 located elsewhere in the environment of the user 120, or collected or received in another way.

According to embodiments, the user device 108 can receive prompts from the user interaction module 116, in order to test various aspects of cognition, according to the accessed profile data 104. For example, the profile data 104 could indicate that the user 120 has been diagnosed with and occasionally exhibits signs of dementia. In this case, the user interaction module 116 could send prompts to the user device that include questions asking the user 120 to enter the current date or time. The user interaction module 116 could also send prompts to the device 108 which could cause the device 108 to ask, over the sound system in the vehicle 124, one or more questions regarding the date, time, and current location. The questions could be designed to test whether or not the user 120 is cognitively engaged. In an example, a user with dementia could be asked the date and the current president over the vehicle speaker system.

In response to the prompts described herein or other prompts, the user interaction module 116 can receive input from the user device. This input could be answers to the questions as well as data surrounding the answers that could serve as indicia of a cognitive state, or other data. For example, the user who's profile indicates she exhibits signs of dementia may respond with an inaccurate date and an incorrect (e.g., historical) president.

A driver monitoring module 118 could also receive data about the user 120, the driver of the vehicle, from the user device 108. This data could be collected by the device and sent to the driver monitoring module 118 of the computer system 110 from one or more sensors 122. These sensors could be part of or attached to the device 108, attached to or a part of the vehicle 124, in the environment surrounding the user 120, affixed to a fitness device or other device worn by the user 120, or in another location. The data could also be collected from applications on the user device 108, within the vehicle 124 (e.g., a global positioning system (GPS)), or from another source. For example, the system could collect data from the device such as the current time is 11 pm. The data could also include a driving history collected from the vehicle's GPS which indicates the vehicle rarely travels at a given time. The system could also collect other data such as, for example, whether or not the driver is currently not wearing shoes.

This data could be sent to the driver monitoring module 118. The NLP communication module 114 could then send the data from the driver monitoring module 118 and the user interaction module 116, along with the profile data 104, to an NLP system 106 over the one or more networks 126. The NLP system 106 may be a computer module that analyzes the received data, electronic documents, and any other data it is able to "ingest" and thus learn. The NLP system may perform various methods and techniques for analyzing the data (syntactic analysis, semantic analysis, etc.). One or more processors of the NLP system may be configured to recognize and analyze any number of natural languages. In some examples, the NLP system may be IBM WATSON which can take a variety of data from a variety of sources. In some embodiments, the NLP system can interpret data by looking for patterns and connections in this data, and it can be trained to interpret the data differentially. Using the real-time, ambient data received from the vehicle control system along with data from other sources, the NLP system can work to make accurate determinations regarding the level of cognitive engagement of the driver.

The NLP system 106 can provide a determination to the computer system 110 via the NLP communication module 114, the determination may indicate whether the driver is cognitively engaged or disengaged. Based on the determination, the computer system 110 can take control of the vehicle 124, in order to for example, prevent the engine from starting, shut off the engine, safely pull off a roadway and stop a vehicle, or direct the vehicle to its destination safely, in the event that the user 120 is assessed to be cognitively disengaged by the NLP system. The driver monitoring module can continue to monitor the user 120 and the user interaction module 116 can continue to send and receive inputs from the user device 108, in order to provide the NLP system 106 with up-to-date data about the user 120. This could also be used to correct mistaken or incorrect determinations. For example, if the user was otherwise preoccupied and was unable to respond to the system's questions, modules of the computer system could receive and collect data that could correct the initial determination (e.g., that the user was not cognitively engaged and thus should not be driving) to an accurate determination (e.g., that the user was merely momentarily distracted).

Figure 2:
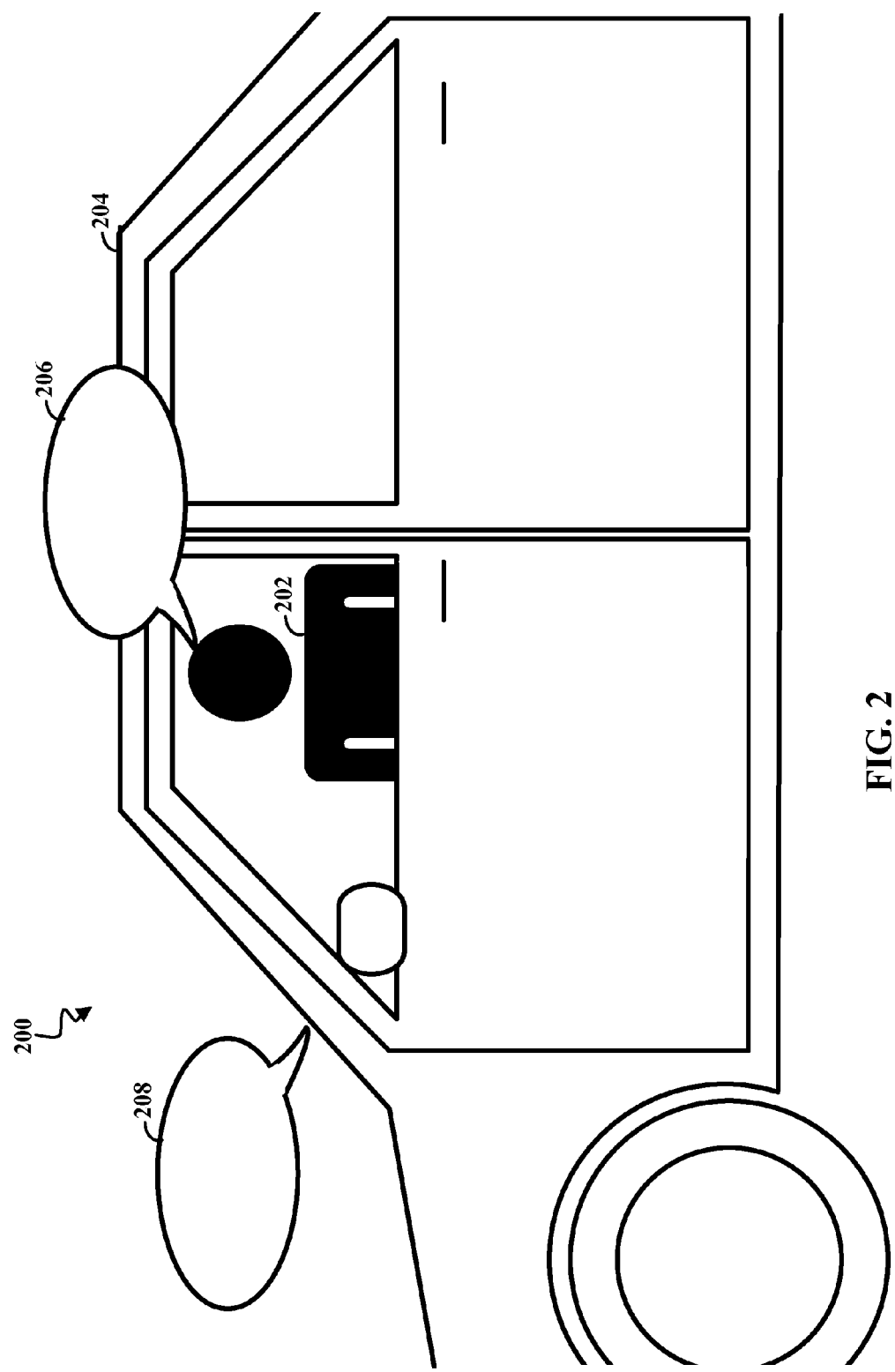
FIG. 2 depicts a diagram of a use case for controlling a vehicle based on feedback from the driver, according to embodiments.

FIG. 2 depicts a diagram 200 of a use case for controlling a vehicle based on feedback from the driver, according to embodiments. The diagram 200 is a view of a particular use case, in which a driver 202 is already in the vehicle 204. The driver 202 could be the same user 120 and the vehicle 204 could be the vehicle 124, both from FIG. 1. The vehicle 204 could be moving down a roadway, parked in a driveway, parking lot or garage, along the side of a road, or elsewhere. In the particular use case depicted, the system is communicating with the driver. This could be in response to a driver entering the vehicle for a first time and the system connecting to the device, where the device and the vehicle are connected. The communication could also be in response to the driver 202 entering a destination into a GPS in the vehicle 204 or on the device, and the NLP system requiring more information to make a determination. The communication could also be in response to a computer system (for example the computer system 110 of FIG. 1) taking control of the vehicle in response to a determination from the NLP system that the driver 202 is cognitively disengaged.

The speech bubble 208 can indicate an audible question posed to the driver by the device through the sound system of the vehicle 204. The bubble 208 could also depict a question posed by the computer system via the screen of the device, which can be read by the driver 202 on the screen or it could be displayed on the dashboard of the vehicle 204. The driver 202 can respond to the prompts or questions from the bubble 208 by audibly speaking an answer, depicted by speech bubble 206. The driver 202 could also respond by typing an answer into the vehicle dash or into the device. The speech bubble 206 could also represent feedback collected from the driver 202 by sensors as described in FIG. 1, according to embodiments.

Figure 3:
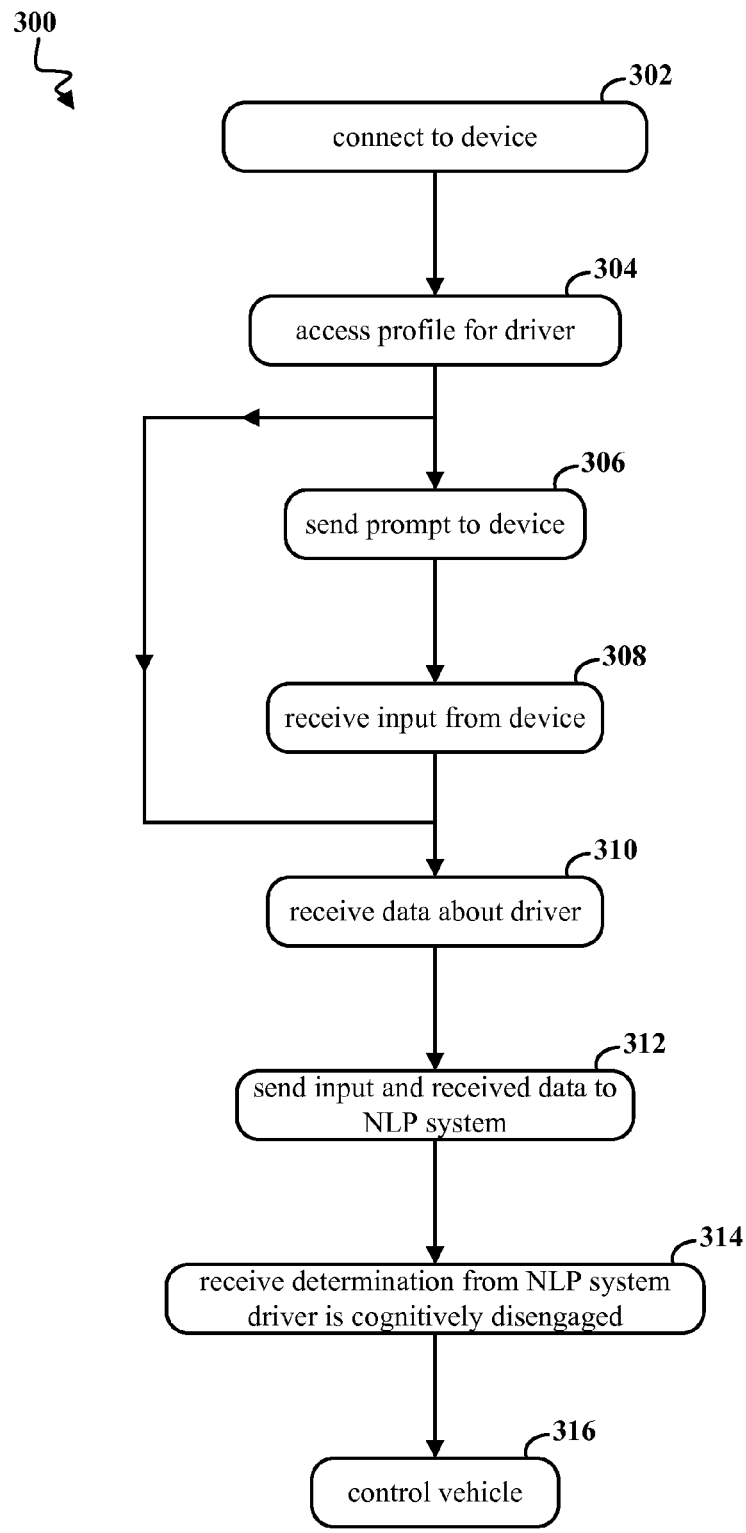
FIG. 3 depicts a flow diagram of a method for controlling a vehicle based on a feedback from a driver of the vehicle, according to embodiments of the present disclosure.

FIG. 3 depicts a flow diagram of a method 300 for controlling a vehicle based on feedback from a driver of the vehicle, according to embodiments of the present disclosure. The method 300 can begin when the system connects to a device associated with the driver, per 302. For example, the driver may be a conductor of a commuter train. The driver could also be one or more operators associated with the control, speed, path, or safety of the train. The device may also be connected to the vehicle. This can occur when a device enters a particular proximity to the vehicle, when the driver sets the device in a docking station, or in another way. For example, the device could be connected to the computer system once the device is inside the vehicle. The system can then access a profile for the driver, per 304. This profile can contain data about the driver including driving habits, driving history, provided medical conditions, personal physical fitness, social media data, phone contacts, other preferences, use history, and other data. For example, a profile of a train conductor (e.g., operator) could include the train conductor's past operation history including when she first received her certification, how many trips she has run, how often she works for the train company, and her usual schedule. The profile could also include her age, data from her social media connections, and medical information.

Based on the data in the profile, the computer system can send one or more prompts to the device, per 306. These prompts could include basic questions about the date, time, or weather, or it could include more health-related questions, the answers of which may assist the NLP system in making its determination. The computer system could then receive input from the device, per 308. This can be answers to the question posed in 306, or the fact that no response has been entered can also be input. The system can also receive data about the driver from the device, per 310. For example, the system could receive data from the device that was collected by sensors on the vehicle, a train. The data could include the rate of the conductor's blinking. The device could also send data to the system that was collected from the conductor's fitness tracking apparatus that could indicate a slowed heart rate and slowed breathing rate. As depicted in FIG. 3, this step can occur following the receipt of input from the device at 308. It can also occur once the profile for the driver is accessed at 304. The system can then send the input received (from 308) and the received data (from 310) to the NLP system for analysis, per 312. The system can then receive a determination from the NLP system that the driver is cognitively disengaged, per 314. For example, the NLP system could process the data including the conductor's highly scheduled work calendar for the past week, her blink rate as detected by the sensors, her slowed heart rate and breathing and determine that the conductor is falling asleep. Thus, the conductor may be considered to be cognitively disengaged from the task of operating the passenger train. In this way, the system can use a determination based on real-time, ambient data as well as from direct driver interaction. If the NLP system determines, based on the data provided to it by the computer system, that the driver is cognitively disengaged, the computer system can take control of the vehicle, per 316. For example, the system could temporarily control the speed of the train. As described herein, the system could also notify one or more contacts associated with the conductor, including the system control for the particular train or railway, one or more other operators on the train, or others.

Figure 4:
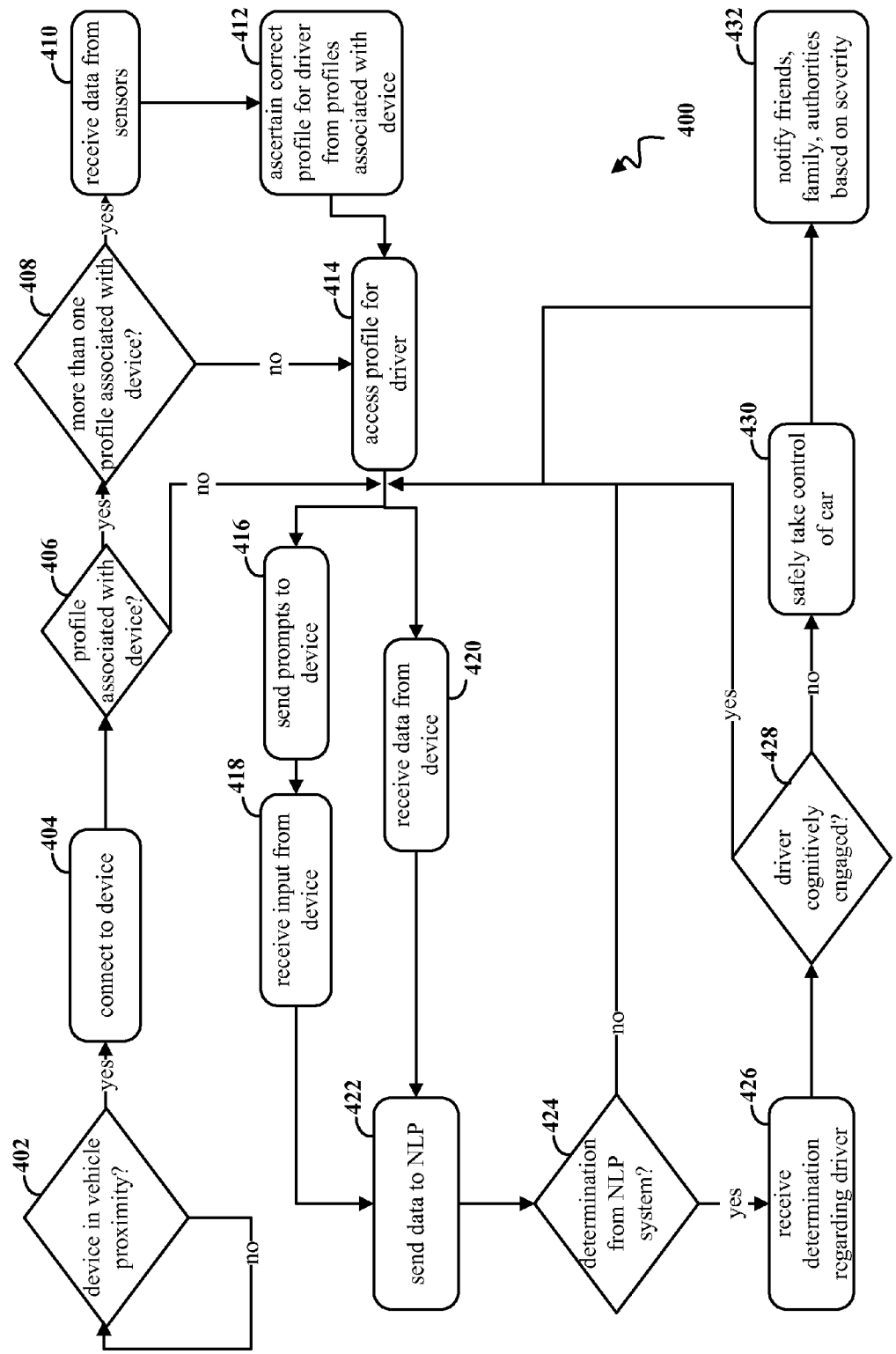
FIG. 4 depicts a method for controlling a vehicle based on feedback from a driver, according to embodiments.

FIG. 4 depicts a method 400 for controlling a vehicle based on feedback from a driver, according to embodiments. The method 400 may be carried out on one or more computer processor circuits. The method 400 may begin when a device is detected within a particular proximity to a vehicle, per 402. If no device is in the proximity, the system may continue monitoring for a device. If a device is in proximity, the system can connect the device and the vehicle to the system, per 404. The system can then determine if there is a profile associated with the device, per 406. If there is no profile associated with the device, the system can move to collecting and receiving data from the driver. If there is at least one profile associated with the device, the system can then determine if there is more than one profile associated with the device, per 408. If more than one profile is associated with the device, the system can collect data from sensors, per 410. These sensors can be affixed to or associated with the device or the vehicle, or they could be anywhere in the driver's environment. The system could collect data that identifies the driver from, for example, other users who have profiles associated with the device. For example, the sensor could collect data that could be used in facial recognition of the driver. The system can then use the data to ascertain the correct profile for the driver from the profiles associated with the device, per 412. Based on this determination, the system can access a profile for the driver, per 414. If, at decision block 408, the system determines there is only one profile associated with the device, the system can directly access the profile for the driver, per 414.

Based on the profile, the system can then collect data from the driver and the driving environment through sensors, input to the device, or other ways according to various embodiments. The system can send prompts to the device, per 416, and receive input from the device, per 418, in response to those prompts. As described herein, no response, a delayed response, or an incorrect response can also be received as input. The system can also receive data about the driver of the vehicle from the device, per 420. This data can be unstructured data or video feeds from sensors in the vehicle or on the device. The data could also be processed data including data received from a driver's personal fitness apparatus via the user device (e.g., smartphone), data from other applications on the user device, or other data. The data could also be data collected from sensors on the device or in the vehicle. The data could also include weather data about the current and future driving conditions, data about the status of the vehicle, data about the intended future destination, or data about past driving history (e.g., historical usage data) collected from the GPS in the vehicle or on the device.

The received data from 420, the received input from 418, and data from the profile accessed at 414 can be sent to an NLP system for analysis, per 422. The computer system can monitor for a determination from the NLP system. If at 424, a determination is available from the NLP system, the computer system can receive the determination regarding the driver, per 426. If at 424, no determination is available, the computer system can loop back to collect more data from the driver, following paths starting with both 416 and 420, in order to have more data to send to the NLP system (the assumption being that the NLP system has not returned a determination because it does not have enough data to make an accurate determination regarding the cognitive state of the driver). If the determination indicates that the driver is cognitively engaged, at 428, the system may loop back to continue collecting data from about the driver, both through prompts, per 416 and from the device as described herein, per 420. If at 428, the determination from the NLP indicates that the driver is not cognitively engaged (i.e., cognitively disengaged), the computer system can safely take over control of the vehicle, as described herein, per 430. For example, in response to the determination that the driver is cognitively disengaged, the system could take control of the vehicle by communicating (e.g., via a signal) with an automated control node in the vehicle, if the vehicle has some aspects of an autonomous vehicle. Control of the vehicle could then be transferred from the driver to the automated node of the vehicle. The system could initiate this transfer, by the use of a signal or another way. The driving and route of the vehicle could then be based on a GPS in the driver's device or in the vehicle itself. The vehicle could be controlled in a number of other ways as well, depending on configurations of the vehicle, the device, the system, or on other factors.

Upon the system taking control of the car at 430, the system can loop back to continue to gather data about the driver and the driver's environment, via 416 and 420. In this way, the system can respond to the current state of the driver in determining whether or not to control the vehicle. For example, if the NLP system determines the driver is cognitively engaged, the computer system can return control of the vehicle to the driver. The system can also notify one or more contacts associated with the driver, per 432. Contacts could include cell phone or smart device contacts, but contacts could also include social, medical, or other persons or entities associated with the driver. The contacts could also include management, co-operators, or others responsible for the control of the vehicle. For example, these contacts could include friends, family, authorities, medical providers, or some or all of the aforementioned, based on the severity of the situation, as determined based on the user profile and the data collected. For example, in a commercial setting, these contacts could also include a copilot, a system administrator, or others.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
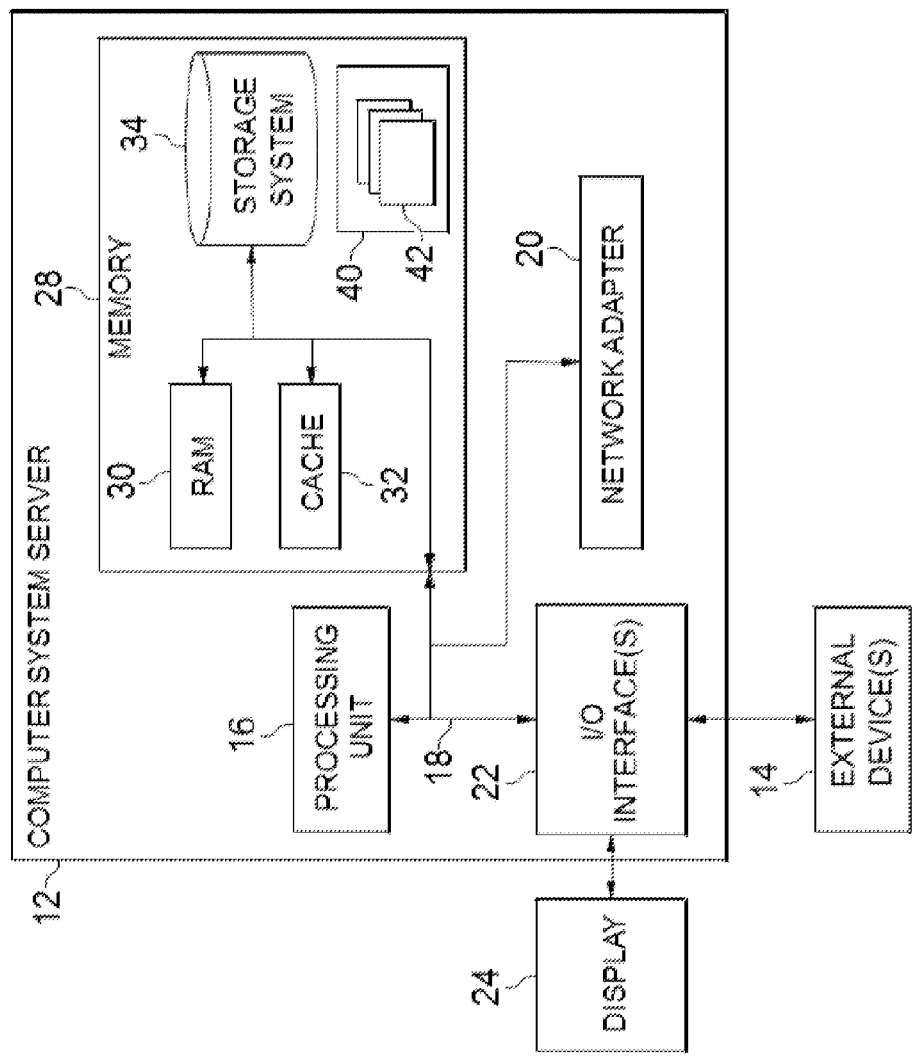
FIG. 5 depicts a cloud computing node according to an embodiment of the present invention.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
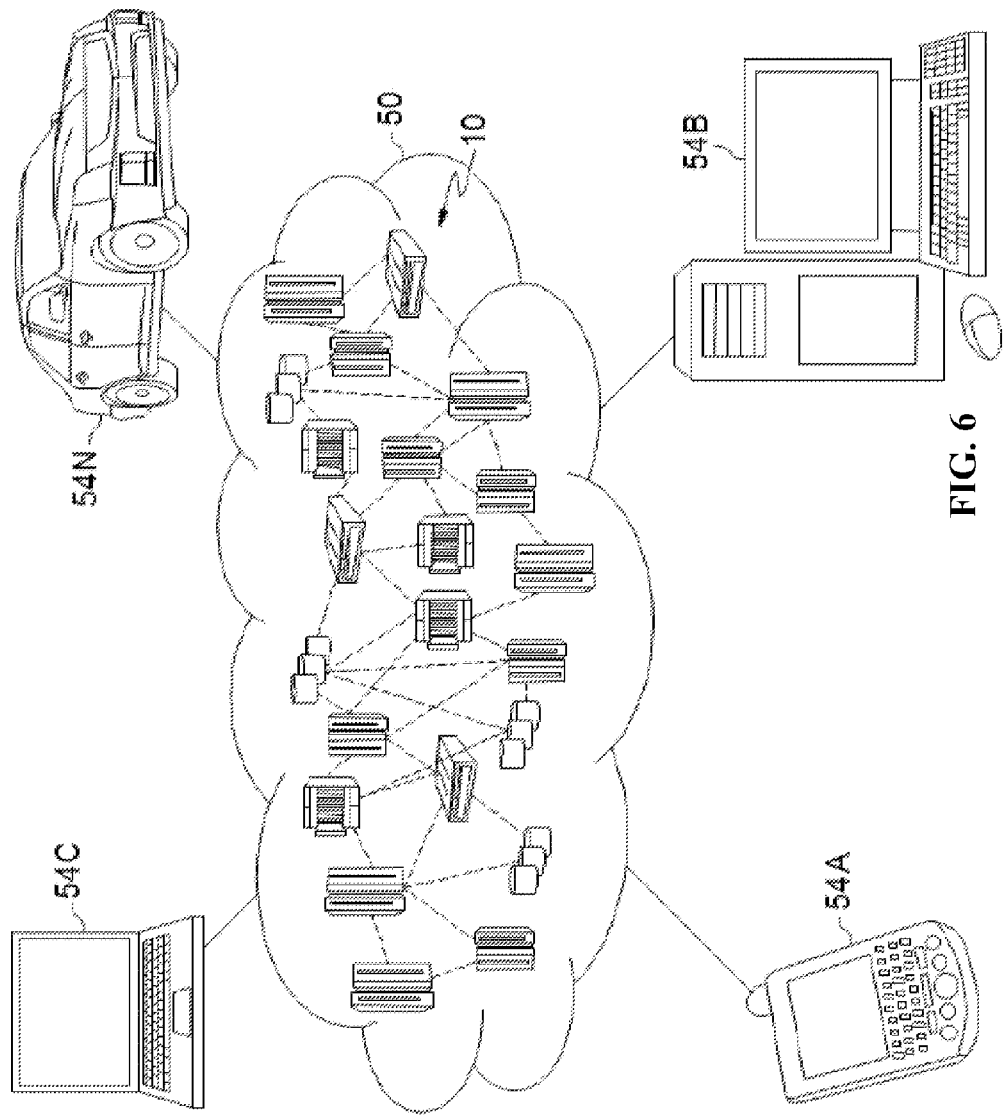
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
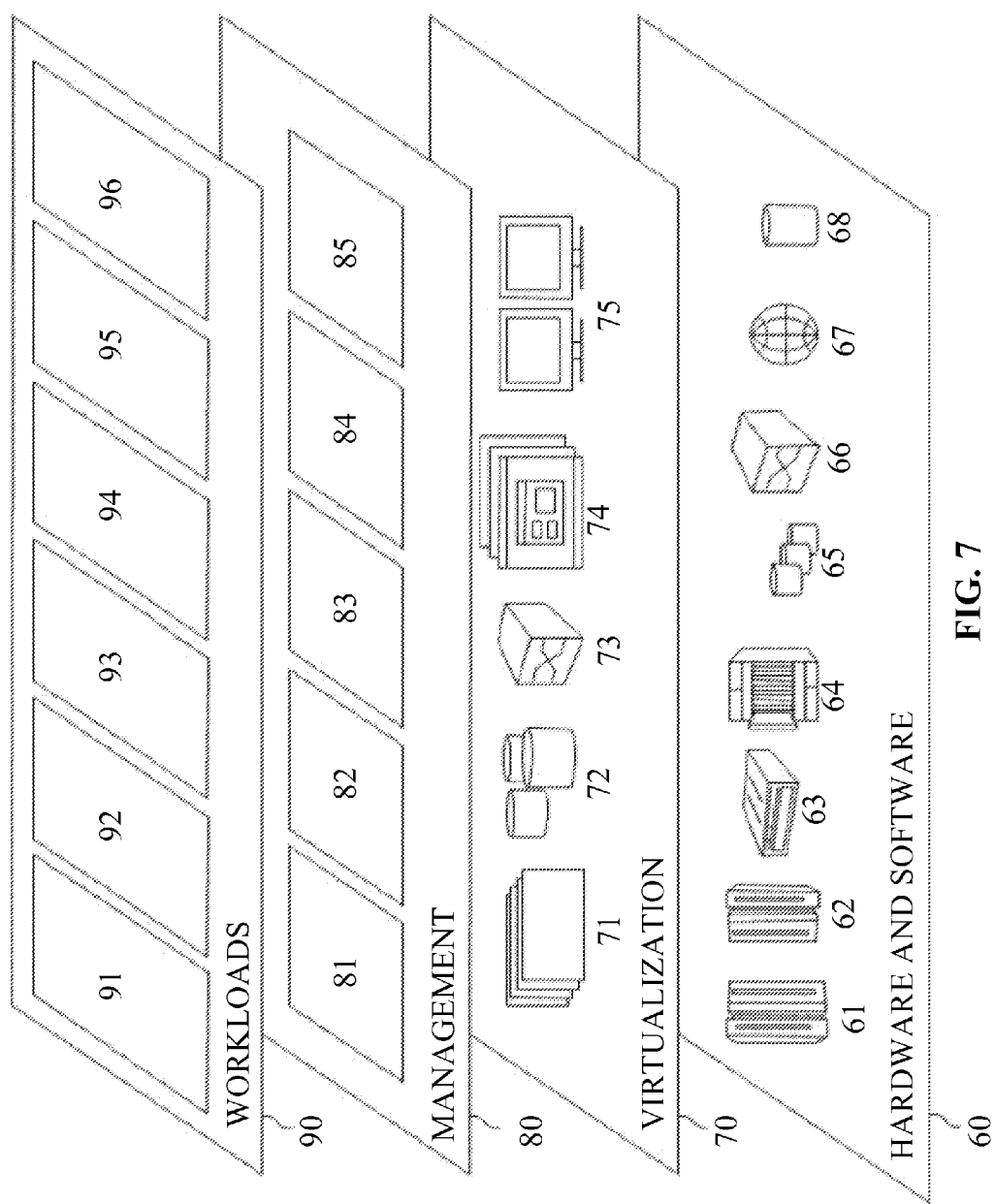
FIG. 7 depicts abstraction model layers according to an embodiment of the present invention.

Referring now to FIG. 7, a set of functional abstraction layers provided by cloud computing environment 50 (FIG.

6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and controlling a vehicle based on feedback 96.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method for controlling a vehicle based on feedback from a driver of the vehicle, the method comprising:
    connecting to a user device, the user device associated with the driver of the vehicle and connected to the vehicle;
    accessing, based on the connecting, a profile associated with the driver of the vehicle, the profile including information regarding the driver's medical conditions;
    receiving, from the user device, data about the driver of the vehicle;
    sending, to a natural language processing (NLP) system, the NLP system configured to process unstructured textual data, the data about the driver of the vehicle and the profile;
    receiving, from the NLP system, a determination based on data, including unstructured textual data, that the driver is cognitively disengaged;
    transfer, based on the determination, control of the vehicle to an automated control node within the vehicle;
    in response to receiving the determination that the driver is cognitively disengaged, determining a severity of the driver's cognitive disengagement;
    determining, based on the severity, one or more contacts associated with the driver to contact; and
    notifying the one or more contacts of the driver's cognitive disengagement.

2. The method of claim 1, further comprising:
    sending, based on the profile, prompts to the user device;
    receiving, in response to the prompts, input from the user device; and
    sending, to the NLP system, the input from the user device.

3. The method of claim 2 wherein the prompts comprise questions designed to test cognitive abilities of the driver.

4. The method of claim 1 further comprising:
    notifying, based on the controlling, one or more contacts associated with the driver of the vehicle.

5. The method of claim 1, wherein controlling the vehicle comprises shutting off an engine of the vehicle.

6. The method of claim 1, wherein controlling the vehicle comprises initiating transfer of control of the vehicle to an automated control node in the vehicle.

7. The method of claim 1, wherein the data about the driver of the vehicle comprises data collected from sensors on the user device and from the vehicle.

8. The method of claim 1, wherein the data about the driver of the vehicle comprises historical usage data, relative to driving patterns.

9. The method of claim 1 further comprising:
    receiving, in response to the controlling and from the user device, additional data about the driver of the vehicle;
    sending, to the NLP system, the additional data about the driver;
    receiving, from the NLP system, a determination that the driver is cognitively engaged;
    initiating transfer of control of the vehicle to the driver.

* * * * *